United States Patent
Xiao (10) Patent No.: US 10,642,515 B2
(45) Date of Patent: May 5, 2020

(54) DATA STORAGE METHOD, ELECTRONIC DEVICE, AND COMPUTER NON-VOLATILE STORAGE MEDIUM

(71) Applicant: Tencent Technology (Shenzhen) Company Limited, Shenzhen (CN)

(72) Inventor: Tao Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 2 days.

(21) Appl. No.: 16/025,562

(22) Filed: Jul. 2, 2018

(65) Prior Publication Data

US 2018/0307428 A1 Oct. 25, 2018

Related U.S. Application Data

(63) Continuation of application No. PCT/CN2017/104515, filed on Sep. 29, 2017.

(30) Foreign Application Priority Data

Oct. 8, 2016 (CN) .......................... 2016 1 0879174

(51) Int. Cl.
*G06F 3/06* (2006.01)
*G06F 16/22* (2019.01)
*G06F 16/00* (2019.01)

(52) U.S. Cl.
CPC .......... *G06F 3/0631* (2013.01); *G06F 3/0604* (2013.01); *G06F 3/064* (2013.01);
(Continued)

(58) Field of Classification Search
None
See application file for complete search history.

(56) References Cited

U.S. PATENT DOCUMENTS 5,873,078 A * 2/1999 Angle .................... G06F 16/322
6,073,076 A * 6/2000 Crowley ................. G01C 21/26
701/400

(Continued)

FOREIGN PATENT DOCUMENTS

AU 2016101183 A4 9/2016
CN 1936864 A 3/2007
(Continued)

OTHER PUBLICATIONS

Corresponding Office Action to CN Application No. 201610879174. 9, dated Oct. 8, 2018, 8 pages.

(Continued)

*Primary Examiner* — Sean D Rossiter
*Assistant Examiner* — Stephanie Wu
(74) *Attorney, Agent, or Firm* — Brinks Gilson & Lione (57) ABSTRACT

A data storage system may obtain data, a size of the data, and a data structure type of the data. The system may allocate a memory block for the data based on the size of the data and a predetermined block size. The system may store the data in the allocated memory block. The allocated memory block may include a block attribute that includes the data and a head comprising management information corresponding to the block attribute. The management information may include a first block identifier for an antecedent memory block and a second block identifier for a succeeding memory block. The system may link, based on the data structure type, the allocated memory block to a plurality of memory blocks arranged in at least one of a block list structure or a tree structure.

18 Claims, 6 Drawing Sheets

(52) U.S. Cl.
CPC .......... *G06F 3/0608* (2013.01); *G06F 3/0673* (2013.01); *G06F 3/0679* (2013.01); *G06F 16/00* (2019.01); *G06F 16/2246* (2019.01)

(56) References Cited

U.S. PATENT DOCUMENTS

| | | | | |
|---|---|---|---|---|
| 7,281,034 | B1* | 10/2007 | Eyal | H04N 21/26258 709/206 |
| 7,809,918 | B1* | 10/2010 | Samuel | G06F 12/023 711/171 |
| 9,582,524 | B1* | 2/2017 | Murali | G06F 16/214 |
| 2007/0100913 | A1* | 5/2007 | Sumner | G06F 11/1453 |
| 2008/0127043 | A1* | 5/2008 | Zhou | G06F 11/3604 717/104 |
| 2010/0030994 | A1* | 2/2010 | Guzman | G06F 12/0223 711/173 |
| 2012/0254277 | A1* | 10/2012 | Ho | G06F 11/0766 709/201 |
| 2014/0201194 | A1* | 7/2014 | Reddy | G06F 16/248 707/722 |
| 2015/0142819 | A1* | 5/2015 | Florendo | G06F 16/22 707/741 |
| 2015/0178258 | A1* | 6/2015 | Meschkat | G06F 17/241 715/230 |
| 2015/0248448 | A1* | 9/2015 | Tsirkin | G06F 16/9027 707/741 |
| 2016/0217167 | A1 | 7/2016 | Zhang et al. | |
| 2016/0275132 | A1* | 9/2016 | Ande | G06F 16/213 |
| 2017/0046324 | A1* | 2/2017 | Hu | G06F 16/5846 |
| 2017/0330279 | A1* | 11/2017 | Ponzone | G06Q 40/06 |
| 2018/0075115 | A1* | 3/2018 | Murray | G06F 16/2456 |

FOREIGN PATENT DOCUMENTS

| | | |
|---|---|---|
| CN | 101276334 A | 10/2008 |
| CN | 103678160 A | 3/2014 |
| CN | 103870259 A | 6/2014 |
| CN | 105573828 A | 5/2016 |
| CN | 105741095 A | 7/2016 |
| WO | WO 2015/078194 A1 | 6/2015 |

OTHER PUBLICATIONS

English translation of International Search Report, issued in International Application No. PCT/CN2017/104515, dated Jan. 4, 2018, pp. 1-2, State Intellectual Property Office of the P.R. China, Beijing, China.

* cited by examiner

DATA STORAGE METHOD, ELECTRONIC DEVICE, AND COMPUTER NON-VOLATILE STORAGE MEDIUM

CROSS REFERENCE TO RELATED APPLICATIONS

This application is a continuation of International Application PCT/CN2017/104515, filed Sep. 29, 2017, entitled DATA STORAGE METHOD, ELECTRONIC DEVICE AND COMPUTER NON-VOLATILE STORAGE MEDIUM, which claims priority to Chinese Patent Application No. 201610879174.9 filed on Oct. 8, 2016, both of which are incorporated herein by reference in their entirety.

TECHNICAL FIELD

The present disclosure relates to the field of data storage, and in particular, to memory management.

BACKGROUND

A key-value storage system may store information in a key-value pair. Traditional approaches to key-value storage involve storing data in a private memory where each string element and each data structure node apply for a memory independently. Usage of a private memory to store and manage data may result in memory fragmentation and a low memory utilization rate.

SUMMARY

Embodiments of this application provides systems and methods related to data storage. In an example, a data storage system may obtain data, a size of the data, and a data structure type of the data. The system may allocate a memory block for the data based on the size of the data and a predetermined block size. The system may store the data in the allocated memory block. The allocated memory block may include a block attribute that includes the data and a head comprising management information corresponding to the block attribute. The management information may include a first block identifier for an antecedent memory block and a second block identifier for a succeeding memory block. The system may link, based on the data structure type, the allocated memory block to a plurality of blocks arranged in at least one of a block list structure or a tree structure.

Additional or alternative features, objectives, and advantages of the present disclosure will become apparent from the specification, accompanying drawings, and claims.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In order to make the objectives, technical solutions, and advantages of this application be more clear and comprehensible, the present disclosure will be further described with reference to the accompany drawings and embodiments. It should be understood that, the specific embodiments described herein are only used to interpret the present disclosure, rather than limiting the present disclosure.

It can be understood that, the terms "the first", "the second", and so on in the present disclosure are used to describe various elements. However, the elements are not limited by the terms. The terms are only used to distinguish the first element from the second element. For example, without departing from the scope of the present disclosure, the first determining circuitry can be referred to as the second determining circuitry, and similarly, the second determining circuitry can be referred to as the first determining circuitry. The first determining circuitry and the second determining circuitry are both determining circuitry, but do not refer to the same determining circuitry.

Figure 1:
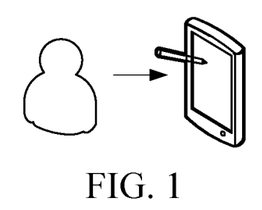
FIG. 1 is a schematic view of an application environment of a data storage method according to an embodiment.

FIG. 1 is a schematic view of an application environment of a data storage method according to an embodiment. As shown in FIG. 1, the application environment includes a storage device. The data storage method may be implemented on the storage device, and is mainly used to implement a data structure of a key-value storage system on a storage space of a non-private memory such as a shared memory or a magnetic disk. The storage device may be any device for storing data, such as a disk, a U disk, and a storage card.

Figure 2:
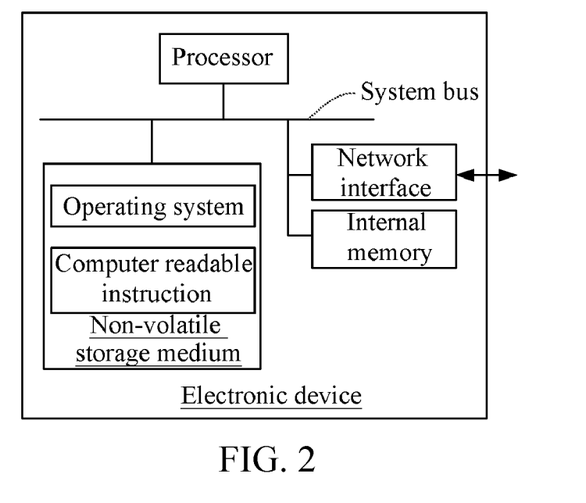
FIG. 2 is a schematic view of an internal structure of an electronic device according to an embodiment.

FIG. 2 is a schematic view of an internal structure of an electronic device according to an embodiment. As shown in FIG. 2, the electronic device includes a processor, a non-transitory storage medium, an internal memory, and a network interface connected through a system bus. The processor is configured to provide computation and control ability to support operation of the whole electronic device. Alternatively or in addition, examples of the processor may include a general processor, a central processing unit, a microcontroller, a server, an application specific integrated circuit (ASIC), a digital signal processor, a field programmable gate array (FPGA), and/or a digital circuit, analog circuit, or some combination thereof. The processor may be one or more devices operable to execute logic. The logic may include computer executable instructions or computer code stored in the memory or in other memory that when executed by the processor, cause the processor to perform the features implemented by the logic of the system or methods described herein. The computer code may include instructions executable with the processor.

The non-transitory storage medium stores an operating system and a computer readable instruction, and the computer readable instruction can be executed by the processor to implement a data storage method. The internal memory provides an environment for operation of the computer readable instruction in the non-volatile storage medium. The electronic device may be a mobile phone, a tablet PC or a personal digital assistant with a storage device, a wearable device, a magnetic disk, a hard disk, or a PC. A person skilled in the art could understand that, the structure shown in FIG. 2 is only a block diagram of a part of structure related to the solution of this application, does not limit the electronic device on which the solution of this application is applied, and a specific electronic device may include more or less members than those in FIG. 2, may be combined with some members, or may have a different member arrangement.

Alternatively or in addition, the non-transitory storage medium may be any device for storing and retrieving data or any combination thereof. The non-transitory storage medium may include non-volatile and/or volatile memory, such as a random access memory (RAM), a read-only memory (ROM), an erasable programmable read-only memory (EPROM), or flash memory. Alternatively or in addition, the non-transitory storage medium may include an optical, magnetic (hard-drive) or any other form of data storage device.

Figure 3:
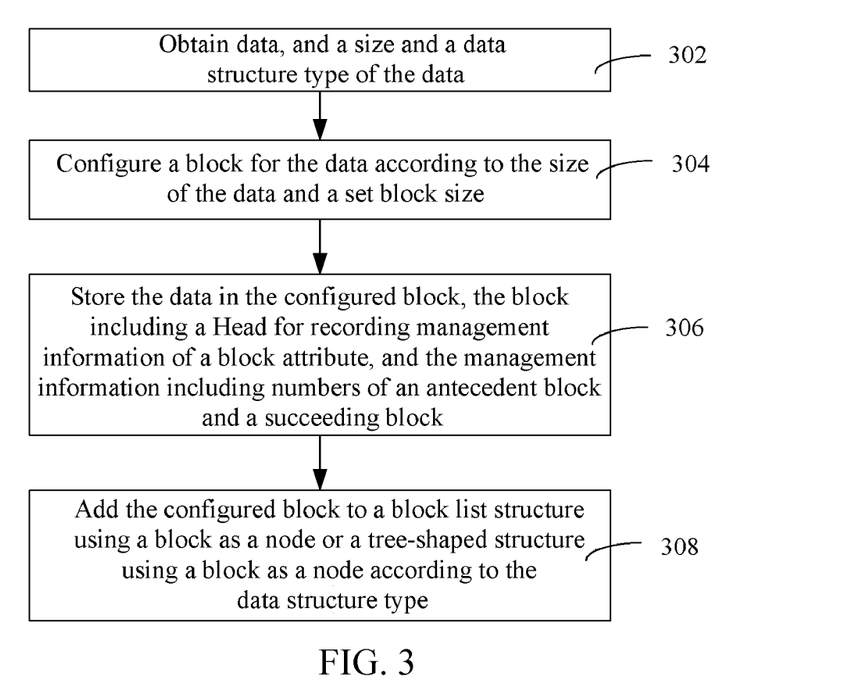
FIG. 3 is an example of a flow diagram for logic of the system.

As shown in FIG. 3, data storage operations may be applied in a key-value storage system to implement data storage, and is operated on a storage device in FIG. 1.

At operation 302, the system may obtain data, a size of the data, and a data structure type of the data. The data may be obtained from a network or collected by a device. The data can be in any size, for example, one byte and 1 KB (kilobyte). The data structure type may be a string (a string type), a list (a list type), hash (a hash value type), set (a string set type), and zset (a sorted string set type).

In some examples, the key-value storage system may be redis, or some other suitable key-value database.

At operation 304, the system may allocate and/or configure a block for the data according to the size of the data and a set block size. As described herein, a block refers to a portion of memory. Alternatively or in addition, a block may include a continuous portion of memory where memory addressee are uninterrupted. A block may interchangeably be referred to as a memory block, as described herein. In some examples, a block allocated each time may have a fixed size. For example, each time when a new block is applied, the size of the allocated block is the same and is a fixed size, for example, the fixed size is but not limited to 128 bytes and 256 bytes. A quantity of blocks that are to be allocated and/or configured for the data can be obtained through computation according to the size of the data and the size of the allocated block.

At operation 306, the system may store the data in the allocated block, the block including a head, or head portion, for recording management information of a block attribute, and the management information including numbers of an antecedent block and a succeeding block. For example, the size of the data is compared with the size of the block, if the size of the data is smaller than or equal to the size of the block, the data may be stored in the block directly, and if the size of the data is larger than the size of the block, a part of data of which the size is equal to the size of the block is split from the data and stored in the block, then, a new block is allocated and/or configured, a part of the remaining data of which the size is equal to the size of the new block is split from the remaining data and stored in the new block, and so on, till all the data is stored in all allocated blocks.

Each block in a block list includes a Head for recording management information of the block list and a block attribute. The block list refers to a list formed by multiple blocks. Each block has a fixed size. The management information may include one or more of which node of all data the data stored in a block belongs to, a size of a part of data that is stored, and numbers of an antecedent block and a succeeding block in the block list. The antecedent block in the block list is a previous block to which a certain block is linked. The succeeding block in the block list is a following block to which a certain block is linked. The block number refers to a string for identifying a block uniquely, for example 001 and 002.

A Head of each block in a balanced tree is used to record management information of a block attribute. The management information of the block attribute stores a block number of a parent node, a block number of a left sub-node, and a block number of a right sub-node, and a balance coefficient. The balance coefficient refers to a height difference between a left sub-tree and a right sub-tree. The block number of the parent node is the number of the antecedent block, the block number of the left sub-node and the block number of the right sub-node are the numbers of the succeeding blocks.

At operation 308 the system may add the allocated block to a block list structure using a block as a node or a tree-shaped structure using a block as a node according to the data structure type. In other words, the system may link, based on the data structure type, the allocated block to a plurality of blocks arranged in at least one of a block list structure or a tree-shaped structure.

A block list structure or a tree-shaped structure has a block for recording Meta data that may include creation time, last modification time, total size, and a quantity of consumed blocks. The creation time refers to time of creating a block list structure or a tree-shaped structure, for example, a block list structure or tree-shaped structure created at 10:20:30 on Jan. 1, 2016. The last modification time refers to time of last modification of a block list structure or a tree-shaped structure, for example, last modification time of a block list structure or a tree-shaped structure is 10:20:30 on Jan. 5, 2016. The total size refers to a total amount of data. The quantity of consumed blocks refers to a quantity of used blocks, for example, using three blocks to store 20 M of data, the quantity of consumed blocks is 3, and the total amount of data is 20 M.

The operation of adding the allocated block to a block list structure using a block as a node or a tree-shaped structure using a block as a node includes obtaining a number of the allocated block, adding the number of the block to a Head of a previous block, using the block as a succeeding block of the previous block, recording a number of the previous block in the Head of the block, and using the previous block as an antecedent block of the block.

The block list structure using a block as a node refers to a structure formed by associating allocated blocks in the form of a list. The tree-shaped structure using a block as a node refers to a structure formed by associating allocated blocks in the form of a balanced tree. The balanced tree refers to a blank tree or that an absolute value of a height difference between a left sub-tree and a right sub-tree of the tree is no larger than 1, and furthermore, the left and right sub-trees are both a balanced binary tree. Common algorithms of the balanced binary tree include a red-black tree, AVL (a balanced binary tree algorithm proposed by G. M.

Adelson-Velsky and E. M. Landis), Treap (tree heap), splay tree, and SBT (Size Balanced Tree).

The data storage method makes data storage be more compact, significantly reduces memory overhead of management, and enhances a utilization rate of memory by obtaining data, and a size and a data structure type of the data, configuring a block of a fixed size, storing the data in the allocated block according to the size of the data, adding the allocated block to a block list structure or a tree-shaped structure according to the data structure type, the block including a Head for recording numbers of an antecedent block and a succeeding block of the block list, associating blocks for storing data through a list or a tree-shaped structure, and performing configuration by using a block of a fixed size.

In an embodiment, the data storage method further includes: adding, if the data structure type is a string type or a list type, the allocated block to the block list structure using a block as a node according to the string type or the list type; and adding, if the data structure type is a hash value type, a string set type, or a sorted string set type zset, each allocated block to the tree-shaped structure using a block as a node according to the hash value type, the string set type, or the sorted string set type zset.

In this embodiment, if a data structure type of data to be stored is a string type, the method is specifically described as follows:

obtaining a size of a string; comparing the size of the string with a size of a block, if the size of the string is smaller than or equal to the size of the block, storing the string in the block, and if the size of the string is larger than the size of the block, splitting the string into multiple sections in a unit of the size of the block, configuring an enough quantity of blocks according to the size of the string, linking the blocks to be a list structure through the Heads of the blocks, and then storing each section of the string in a block correspondingly.

Figure 4:
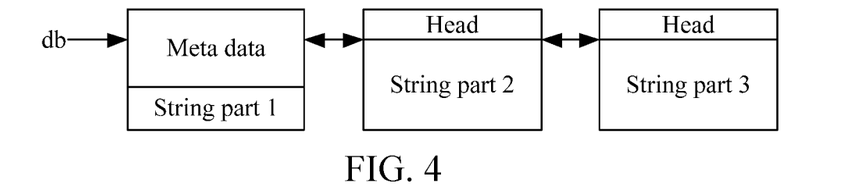
FIG. 4 is a schematic view of storing string type data in a block list.

FIG. 4 is a schematic view of storing a string type data in a block list. As shown in FIG. 4, a first block of a string data structure type in a database db stores Meta data and String part 1 (the first part of the same string), a second block includes a Head and stores String part 2 (the first part of the same string), and the third block includes a Head and stores String part 3 (the first part of the same string). A complete string is an element. Meta data stores any Meta data, including creation time, last modification time, total length, and a quantity of consumed blocks. The Head records management information of a block list and a block attribute, and the management information may include a node of a string to which a block belongs, a length of a stored part, and numbers of an antecedent block and a succeeding block in a block list. For example, a number of the first block is block1, a number of the second number is block2, a number of the third block is block3, and a Head of the second block stores the number block1 of the first block and the number block3 of the third block.

(2) The Data Structure Type is a List Type List.

Specifically, the list type is a discontinuous and non-sequential storage structure on a physical storage unit, and a logic sequence of data elements is implemented through a pointer linking sequence in a list. A Head of a list stores a pointer pointing to a next storage address. Elements of a list are stored in the block list, each block stores several elements, a string of each element may be placed in a current block, or only an index is placed and the string is recorded in an external block list. A quantity of elements stored in each block is associated with a size of a block and a size of an element, for example, if a size of a block is 10 M, sizes of four elements are respectively 1 M, 3 M, 5 M, and 4 M, the block can store the first three elements, and the fourth element cannot be stored in the block.

In an embodiment, the data storage method further includes: obtaining a size of a string of an element in a data structure type if the data structure type is a list type; determining whether the size of the string of the element is smaller than or equal to a size of a remaining space of a current to-be-stored block, if the size of the string of the element is smaller than or equal to the size of the remaining space of the current to-be-stored block, storing the string of the element in the current to-be-stored block, and if the size of the string of the element is not smaller than or equal to the size of the remaining space of the current to-be-stored block, obtaining a size of an index of the string of the element, determining whether the size of the index of the string of the element is smaller than or equal to the size of the remaining space of the current to-be-stored block, if the size of the index of the string of the element is smaller than or equal to the size of the remaining space of the current to-be-stored block, storing the index of the string of the element in the current to-be-stored block, and storing the string of the element in an external block list corresponding to the index.

Specifically, for example, a size of a space of a current block is 100 bytes, and is 80 bytes if not considering a Head of a node of a list. If a size of a string of an element is shorter than 80 bytes, the element may be stored in the current block directly, and otherwise, an index of the string of the element is stored in the current block, and the string of the element is stored in an external block list. The external block list refers to a block list formed by blocks outside a block node in a list data structure type, and is used to store a block list of a string. A block outside a block node refers to a block that is not in the same block list as an allocated block node.

Furthermore, the storing the string of the element in an external block list corresponding to the index includes: determining whether the size of the string of the element is smaller than or equal to a size of an external block, if the size of the string of the element is smaller than or equal to the size of the external block, storing the string of the element in the external block, and if the size of the string of the element is not smaller than or equal to the size of the external block, splitting the string of the element into multiple sections according to the size of the external block, configuring a corresponding quantity of external blocks, associating the corresponding quantity of external blocks to form the external block list, and storing the string of the element in the external block lists.

Figure 5:
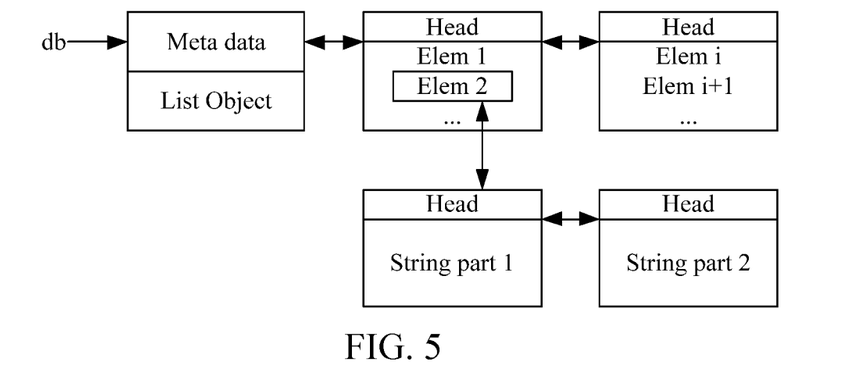
FIG. 5 is a schematic view of storing data in a list data structure type.

FIG. 5 is a schematic view of storing data in a list data structure type. As shown in FIG. 5, a first block of a link data structure type in a database (db) stores Meta data and List Object, a second block includes a Head and stores Elem 1, Elem 2, and so on, a third block includes a Head and stores Elem i, Elem i+1, and so on. Meta data stores any Meta data, including creation time, last modification time, total length, and a quantity of consumed blocks. Head records management information of a block list and a block attribute, and the management information includes a node of a string to which a block belongs, a size of a part that is stored, and numbers of an antecedent block and a succeeding block in the block list. The first element Elem 1 stored in the second block is an enough short string, for example, "abc" added with length management, the length is represented in the form of plaintext+colon, and the string of the element is "3:abc", five bytes in total, and can be stored in the second block without requiring an external link index. The second element Elem 2 is very long, has hundreds of bytes, and cannot be stored in the second block, and then, the second element Elem 2 is stored in an external block list, an index of the string of the second element is stored in a block node in a list data type, that is, framed Elem 2. The external block list stores the string of the second element.

In an embodiment, the data storage method includes: obtaining a data access request and locating a corresponding block in a block list according to the data access request and traversing the block to obtain data required based on the data access request.

In an embodiment, when a block is inserted with an element and cannot store data, the data in the block is split and stored in other blocks. When an application layer needs to insert an element into a certain block, the element is inserted into the corresponding block.

Figure 6:
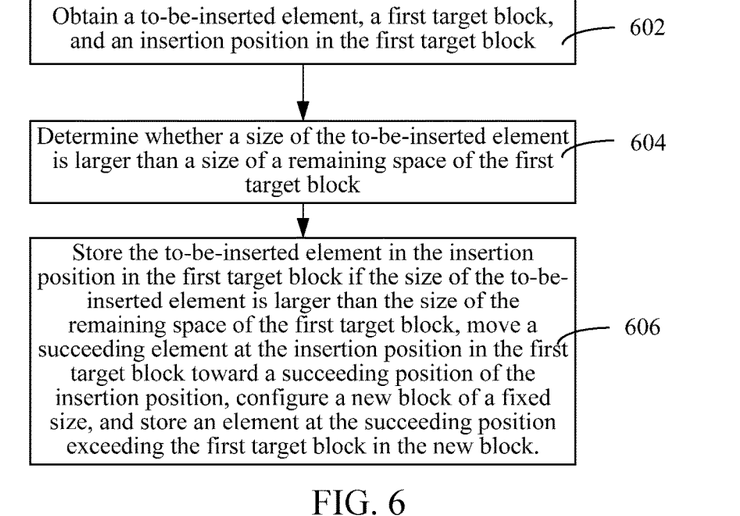
FIG. 6 is an example of a flow diagram of logic for inserting an element.

FIG. 6 illustrates an example of a flow diagram of logic for inserting an element. At operation 602, the system may obtain a to-be-inserted element, a first target block, and an insertion position in the first target block. For example, if a lock list is provided, search for a corresponding block according to a number of the first target block. If a balanced tree is provided, a search manner of a balanced binary tree is used to compare a block number of the first target block with a block number of a root node in the balanced tree, if the block number of the first target block is smaller than the block number of the root node in the balanced tree, search from a left sub-tree node, if the block number of the first target block is larger than the block number of the root node in the balanced tree, search from a right sub-tree node, and so on, till a block with the same number as the first target block is searched.

At operation 604, the system may determine whether a size of the to-be-inserted element is larger than a size of a remaining space of the first target block.

At operation 606, the system may store the to-be-inserted element in the insertion position in the first target block if the size of the to-be-inserted element is larger than the size of the remaining space of the first target block, move a succeeding element at the insertion position in the first target block toward a succeeding position of the insertion position, allocated a new block of a fixed size, and store an element at the succeeding position exceeding the first target block in the new block. Modify a number of a succeeding block stored in the first target block as a new block, configure the number of the succeeding block recorded in a Head in the new block as a number of an original succeeding block recorded in the first target block, and configure a number of an antecedent block recorded in the Head in the new block as the number of the first target block.

For example, it is assumed that a block A stores three strings "abc", "def", and "ghi", if a string "123" needs to be inserted between "def" and "ghi", the block A is fully occupied after insertion and cannot store "ghi", a new idle block B is configured to store "ghi", and the original block A store "abc", "def", and "123".

In an embodiment, when a block has a spare space due to a deleted element, an antecedent block and a succeeding block of the block are checked and combined.

Figure 7:
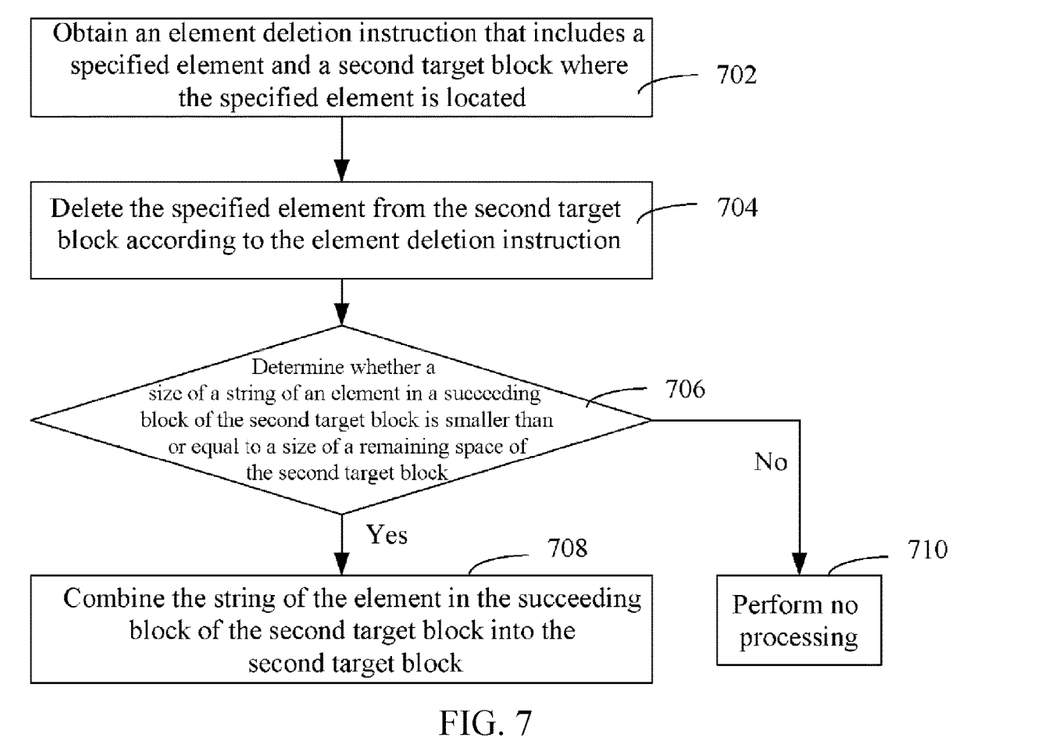
FIG. 7 is an example of a flow diagram of logic for deleting an element.

FIG. 7 is an example of a flow diagram of logic for deleting an element. At operation 702, the system may obtain an element deletion instruction that includes a specified element and a second target block where the specified element is located.

At operation 704, the system may delete the specified element from the second target block according to the element deletion instruction.

At operation 706, the system may determine whether a size of a string of an element in a succeeding block of the second target block is smaller than or equal to a size of a remaining space of the second target block, if the size of the string of the element in the succeeding block of the second target block is smaller than or equal to the size of the remaining space of the second target block, perform step 708, and if the size of the string of the element in the succeeding block of the second target block is not smaller than or equal to the size of the remaining space of the second target block, perform step 710.

At operation 708, the system may combine the string of the element in the succeeding block of the second target block into the second target block.

At operation 710, the system may finalize processing. For example, after element deletion, the block having an element deleted and data in the succeeding block are combined into one block to release a block space and avoid wasting.

(3) The Data Structure Type is a Hash Value Type.

A balanced tree is used to organize each block, and each block may store a plurality of key-value pairs therein. In the balanced tree, distribution of key-value pairs is sequential arrangement made according to the content of the key, for example, if a key of an element is abc, the key is definitely before another element with key "def".

The balanced tree organizes each block by using a balanced binary tree principle, and is a blank tree or an absolute value of a height difference between a left sub-tree and a right sub-tree of the tree is no larger than 1, and furthermore, the left sub-tree and the right sub-tree are both a balanced binary tree. For example, a block with a block number 1 is selected as a root node first, a block with a block number larger than that of a parent node is located at the left sub-tree, and a block with a block number smaller than that of the parent node is located at the right sub-tree. A block number 2 and a block number 3 are added following the block number 1 and are both located at the right sub-tree, with a result that the balanced tree is not balanced, and then the balanced tree is rotated to change the block number 2 as the parent node, the block number 1 is added to the left sub-tree with the block number 2, the block number 3 is added to the right sub-tree with the block number 2, and a plurality of blocks is added in the same manner in the following operation. A Head of each block in the balanced tree stores a block number of the parent node, a block number of a left sub-node, and a block number of a right sub-node, and a balance coefficient. The balance coefficient refers to a height difference between the left sub-tree and the right sub-tree. The block number of the parent node is the number of an antecedent block, and the block numbers of the left sub-node and the right sub-node are the numbers of succeeding blocks.

Figure 8:
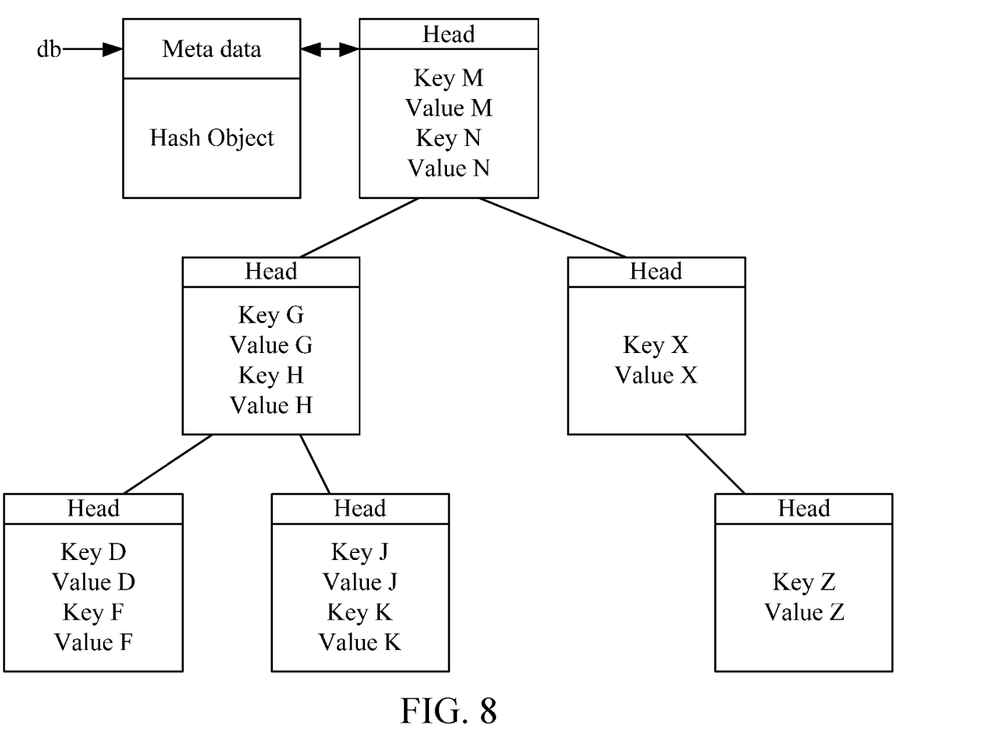
FIG. 8 is a schematic view of storing hash value type data.

FIG. 8 is a schematic view of storing hash value type data. As shown in FIG. 8, a first block of a hash value data structure type in a database (db) stores Meta data and Hash Object. A second block includes a Head and stores Key M Value M and Key N Value N. A second block is linked to a third block and a fourth block. The third block includes a Head and stores Key G Value G and Key H Value H. The third block is linked to a fifth block and a sixth block. The fifth block includes a Head and stores Key D Value D and Key F Value F. The sixth block includes a Head and stores Key J Value J and Key K Value K. The fourth block includes a head and stores Key X Value X. The fourth block is linked to the seventh block. The seventh block includes a Head and stores Key Z Value Z.

In an embodiment, the data storage method further includes: obtaining a size of a string of an element in the data structure type if the data structure type is a hash value type; determining whether the size of the string of the element is smaller than or equal to a size of a remaining space of a current to-be-stored block, if the size of the string of the element is smaller than or equal to the size of the remaining space of the current to-be-stored block, storing the string of the element in the current to-be-stored block, and if the size of the string of the element is not smaller than or equal to the size of the remaining space of the current to-be-stored block, obtaining a size of an index of the string of the element, determining whether the size of the index of the string of the element is smaller than or equal to the size of the remaining space of the current to-be-stored block, if the size of the index of the string of the element is smaller than or equal to the size of the remaining space of the current to-be-stored block, storing the index of the string of the element in the current to-be-stored block, and storing the string of the element in an external block list corresponding to the index.

In an embodiment, the data storage method further includes: obtaining a to-be-inserted element, a first target block, and an insertion position in the first target block if the data structure type is a hash value type; determining whether a size of the to-be-inserted element is larger than a size of a remaining space of the first target block; storing the to-be-inserted element in the insertion position in the first target block if the size of the to-be-inserted element is larger than the size of the remaining space of the first target block, moving a succeeding element at the insertion position in the first target block toward a succeeding position of the insertion position, configuring a new block of a fixed size, and storing an element at the succeeding position exceeding the first target block in the new block.

In an embodiment, the data storage method further includes: obtaining an element deletion instruction that includes a specified element and a second target block where the specified element is located if the data structure type is a hash value type; deleting the specified element from the second target block according to the element deletion instruction; and determining whether a size of a string of an element in a succeeding block of the second target block is smaller than or equal to a size of a remaining space of the second target block, if the size of the string of the element in the succeeding block of the second target block is smaller than or equal to the size of the remaining space of the second target block, combining the string of the element in the succeeding block of the second target block into the second target block.

When an element is inserted or deleted, a balanced tree algorithm is used to search for an antecedent block and a succeeding block of a block.

In an embodiment, the data storage method further includes: obtaining a data access request; and locating a corresponding block in the tree-shaped structure according to the data access request and traversing the block to obtain data corresponding to the data access request.

Specifically, the corresponding block is located through a balanced tree algorithm.

(4) The Data Structure Type is a String Set Type.

A balanced tree is used to organize each block, and each block includes a key.

Figure 9:
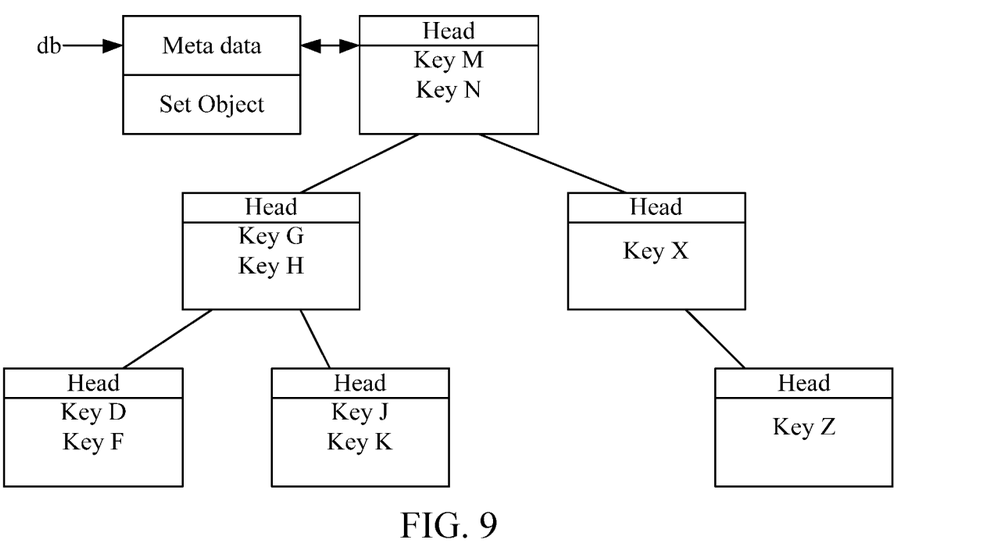
FIG. 9 is a schematic view of storing string set type data.

FIG. 9 is a schematic view of storing string set type data. As shown in FIG. 9, a first block of a string set data structure type in a database (db) stores Meta data and set Object. A second block includes a Head and stores Key M and Key N. The second block is linked to a third block and a fourth block. The third block includes a Head and stores Key G and Key H. The third block is linked to a fifth block and a sixth block. The fifth block includes a Head and stores Key D and Key F. The sixth block includes a Head and stores Key J and Key K. The fourth block includes a Head and stores Key X. The fourth block is linked to a seventh block. The seventh block includes a Head and stores Key Z.

In an embodiment, the data storage method further includes: obtaining a size of a string of an element in a data structure type if the data structure type is a string set type; determining whether the size of the string of the element is smaller than or equal to a size of a remaining space of a current to-be-stored block, if the size of the string of the element is smaller than or equal to the size of the remaining space of the current to-be-stored block, storing the string of the element in the current to-be-stored block, and if the size of the string of the element is not smaller than or equal to the size of the remaining space of the current to-be-stored block, obtaining a size of an index of the string of the element, determining whether the size of the index of the string of the element is smaller than or equal to the size of the remaining space of the current to-be-stored block, if the size of the index of the string of the element is smaller than or equal to the size of the remaining space of the current to-be-stored block, storing the index of the string of the element in the current to-be-stored block, and storing the string of the element in an external block list corresponding to the index.

In an embodiment, the data storage method further includes: obtaining a to-be-inserted element, a first target block, and an insertion position in the first target block if the data structure type is a string set type; determining whether a size of the to-be-inserted element is larger than a size of a remaining space of the first target block; storing the to-be-inserted element in the insertion position in the first target block if the size of the to-be-inserted element is larger than the size of the remaining space of the first target block, moving a succeeding element at the insertion position in the first target block toward a succeeding position of the insertion position, configuring a new block of a fixed size, and storing an element at the succeeding position exceeding the first target block in the new block.

In an embodiment, the data storage method further includes: obtaining an element deletion instruction that includes a specified element and a second target block where the specified element is located if the data structure type is a string set type; deleting the specified element from the second target block according to the element deletion instruction; and determining whether a size of a string of an element in a succeeding block of the second target block is smaller than or equal to a size of a remaining space of the second target block, if the size of the string of the element in the succeeding block of the second target block is smaller than or equal to the size of the remaining space of the second target block, combining the string of the element in the succeeding block of the second target block into the second target block.

When an element is inserted or deleted, a balanced tree algorithm is used to search for an antecedent block and a succeeding block of a block.

(5) The Data Structure Type is a Sorted String Set Type Zset.

Specifically, each zset includes two parts, one is a data set with the same structure as set, and the other is sorting according to a score, and realized by using a balanced tree.

Figure 10:
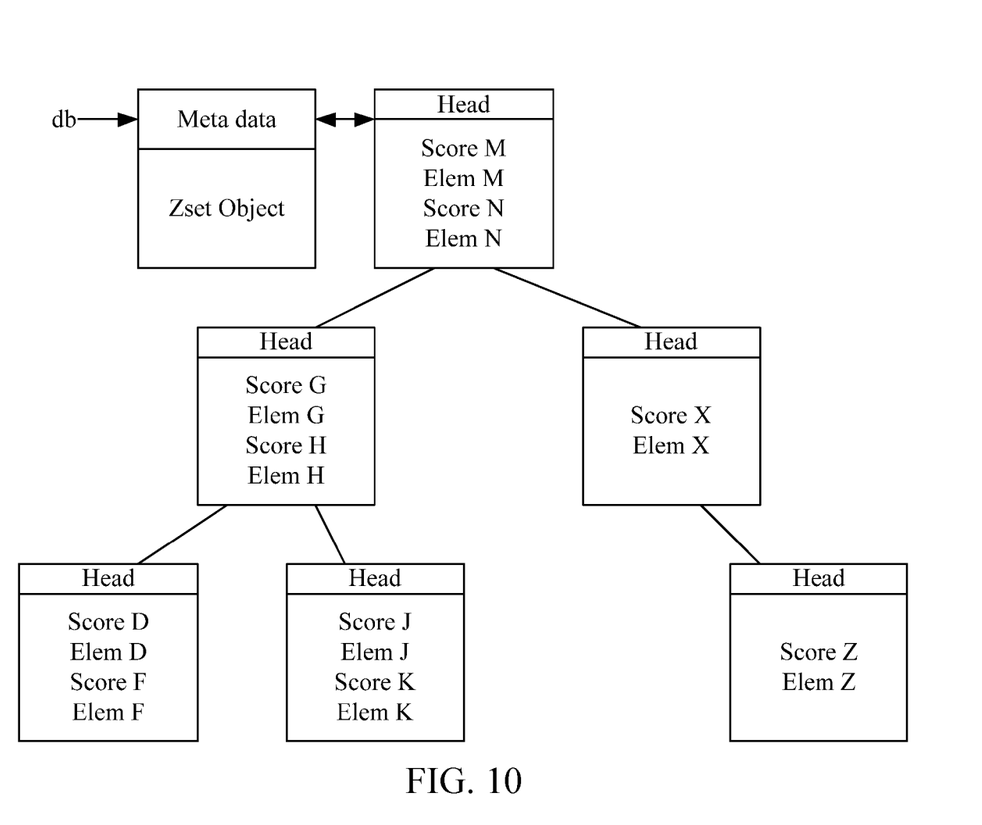
FIG. 10 is a schematic view of storing sorted string set type data.

FIG. 10 is a schematic view of storing sorted string set type data. As shown in FIG. 10, a first block of a sorted string set data structure type in a database (db) stores Meta data and Zset Object. A second block includes a Head and stores Score M, Elem M, Score N, and Elem N. The second block is linked to a third block and a fourth block. The third block includes a Head and stores Score G, Elem G, Score H, and Elem H. The third block is linked to a fifth block and a sixth block. The fifth block includes a Head and stores Score D, Elem D, Score F, and Elem F. The sixth block includes a Head and stores Score J, Elem J, Score K, and Elem K. The fourth block includes a Head and stores Score X and Elem X. The fourth block is linked to a seventh block. The seventh block includes a Head and stores Score Z and Elem Z.

In an embodiment, the data storage method further includes: obtaining a size of a string of an element in a data structure type if the data structure type is a sorted string set type zset; and determining whether the size of the string of the element is smaller than or equal to a size of a remaining space of a current to-be-stored block, if the size of the string of the element is smaller than or equal to the size of the remaining space of the current to-be-stored block, storing the string of the element in the current to-be-stored block, and if the size of the string of the element is not smaller than or equal to the size of the remaining space of the current to-be-stored block, obtaining a size of an index of the string of the element, determining whether the size of the index of the string of the element is smaller than or equal to the size of the remaining space of the current to-be-stored block, if the size of the index of the string of the element is smaller than or equal to the size of the remaining space of the current to-be-stored block, storing the index of the string of the element in the current to-be-stored block, and storing the string of the element in an external block list corresponding to the index.

In an embodiment, the data storage method further includes: obtaining a to-be-inserted element, a first target block, and an insertion position in the first target block if the data structure type is a sorted string set type zset; determining whether a size of the to-be-inserted element is larger than a size of a remaining space of the first target block; storing the to-be-inserted element in the insertion position in the first target block if the size of the to-be-inserted element is larger than the size of the remaining space of the first target block, moving a succeeding element at the insertion position in the first target block toward a succeeding position of the insertion position, configuring a new block of a fixed size, and storing an element at the succeeding position exceeding the first target block in the new block.

In an embodiment, the data storage method further includes: obtaining an element deletion instruction that includes a specified element and a second target block where the specified element is located if the data structure type is a sorted string set type zset; deleting the specified element from the second target block according to the element deletion instruction; and determining whether a size of a string of an element in a succeeding block of the second target block is smaller than or equal to a size of a remaining space of the second target block, if the size of the string of the element in the succeeding block of the second target block is smaller than or equal to the size of the remaining space of the second target block, combining the string of the element in the succeeding block of the second target block into the second target block.

When an element is inserted or deleted, a balanced tree algorithm is used to search for an antecedent block and a succeeding block of a block.

In an embodiment, the data storage method further includes: obtaining a hash value of a key in each block of the tree-shaped structure if the data structure type is a hash value type, a string set type, or a sorted string set type zset, dividing the key into multiple parts according to the hash value of the key, and storing each part of the key by using an independent balanced tree; obtaining a query instruction of the key; and searching for the key from the independent balanced tree according to the query instruction.

A key is divided into N parts, each part is stored by using an independent balanced tree, and when a key is searched for, which tree the key is located is computed first, then the tree is searched for the key, and since a data amount of each tree is only 1/N of the whole, the speed is enhanced, N being a natural number.

It should be noted that, compared with the original redis, the method for implementing a data structure of a key-value storage system in the present disclosure can store data compactly and significantly reduce memory overhead of data management, and at the same time, since the method supports a management manner of applying for release of a memory of a fixed size, a redis data structure can be implemented conveniently in a storage space of a non-private memory such as a shared memory and a magnetic disk.

Figure 11:
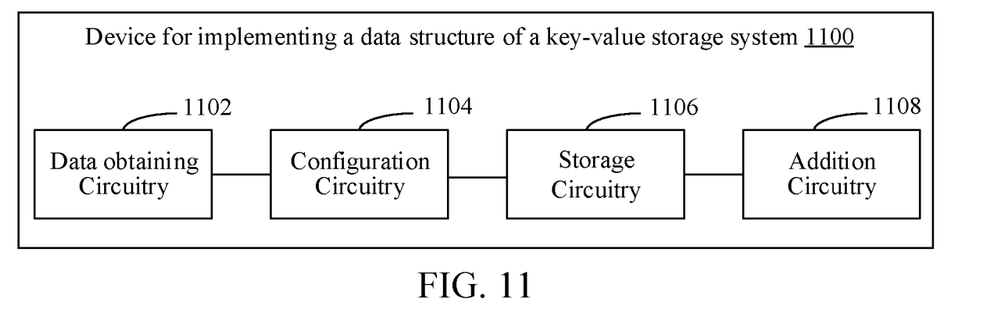
FIG. 11 is a block structural diagram of a data storage device according to an embodiment.

FIG. 11 is a block structural diagram of a data storage device according to an embodiment. As shown in FIG. 11, a data storage device 1100 includes a data obtaining circuitry 1102, a configuration circuitry 1104, a storage circuitry 1106, and an addition circuitry 1108.

The data obtaining circuitry 1102 is configured to obtain data, and a size and a data structure type of the data.

The configuration circuitry 1104 is configured to configure a block for the data according to the size of the data and a set block size. The size of the block configured each time is fixed.

The storage circuitry 1106 is configured to store the data in the configured block, the block including a Head for recording management information of a block attribute, and the management information including numbers of an antecedent block and a succeeding block. A block in a block list includes a Head for recording management information of a block list and a block attribute, and the management information including numbers of an antecedent block and a succeeding block in the block list.

The addition circuitry 1108 is configured to add the configured block to a block list structure using a block as a node or a tree-shaped structure using a block as a node according to the data structure type.

The data storage device makes data storage be more compact, significantly reduces memory overhead of management, and enhances a utilization rate of memory by obtaining data, and a size and a data structure type of the data, configuring a block of a fixed size, storing the data in the configured block according to the size of the data, adding the configured block to a block list structure or a tree-shaped structure according to the data structure type, the block including a Head for recording numbers of an antecedent block and a succeeding block of the block list, associating blocks for storing data through a list or a tree-shaped structure, and performing configuration by using a block of a fixed size.

In an embodiment, the addition circuitry 1108 is configured to add, if the data structure type is a string type or a list type, the configured block to the block list structure using a block as a node according to the string type or the list type; and add, if the data structure type is a hash value type, a string set type, or a sorted string set type zset, each configured block to the tree-shaped structure using a block as a node according to the hash value type, the string set type, or the sorted string set type zset.

Figure 12:
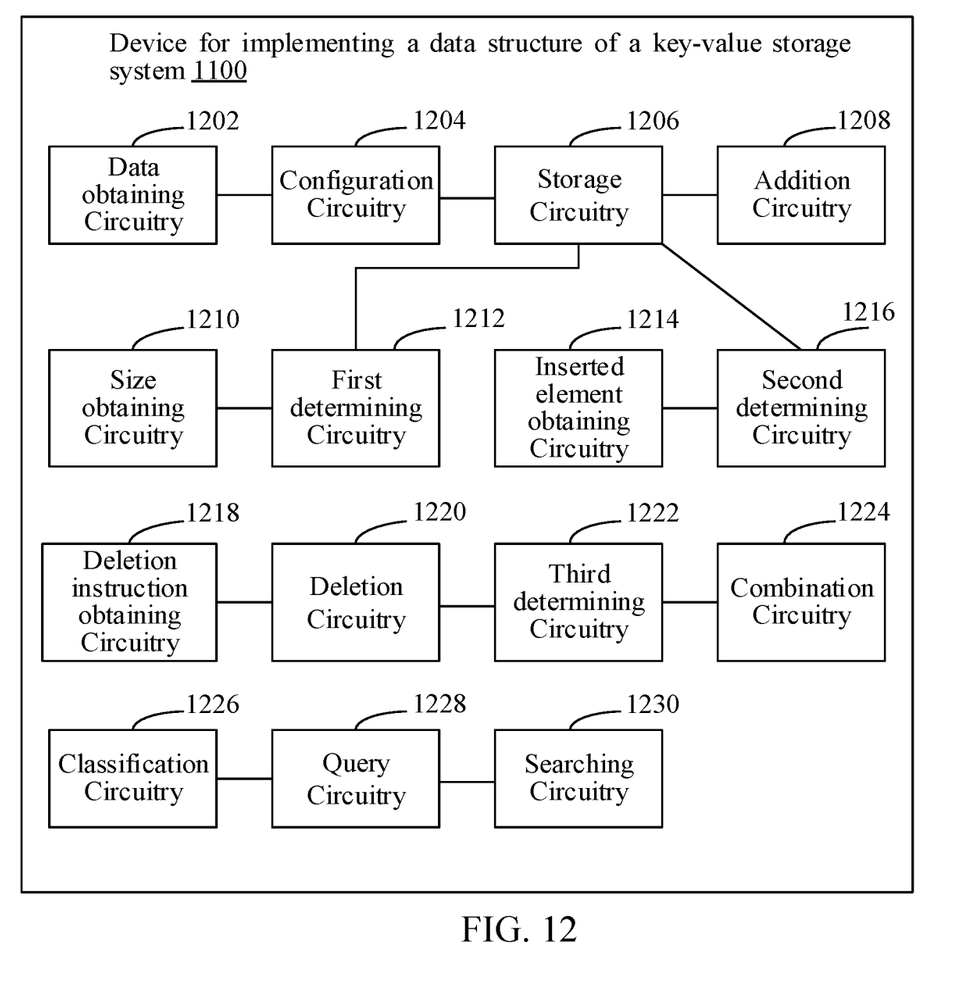
FIG. 12 is a block structural diagram of a data storage device according to another embodiment.

FIG. 12 is a block structural diagram of a data storage device according to another embodiment. As shown in FIG. 12, a data storage device 1200 includes a data obtaining circuitry 1202, a configuration circuitry 1204, a storage circuitry 1206, an addition circuitry 1208, a size obtaining circuitry 1210, a first determining circuitry 1212, an inserted element obtaining circuitry 1214, a second determining circuitry 1216, an deletion instruction obtaining circuitry 1218, a deletion circuitry 1220, a third determining circuitry 1222, a combination circuitry 1224, a classification circuitry 1226, a query circuitry 1228, and a searching circuitry 1230.

The size obtaining circuitry 1210 is configured to obtain a size of a string of an element in the data structure type if the data structure type is a list type, a hash value type, a string set type, or a sorted string set type zset.

The first determining circuitry 1212 is configured to determine whether the size of the string of the element is smaller than or equal to a size of a remaining space of a current to-be-stored block. If the size of the string of the element is smaller than or equal to the size of the remaining space of the current to-be-stored block, the storage circuitry 1206 is further configured to store the string of the element in the current to-be-stored block. If the size of the string of the element is not smaller than or equal to the size of the remaining space of the current to-be-stored block, the size obtaining circuitry 1210 is further configured to obtain a size of an index of the string of the element, the first determining circuitry 1212 is further configured to determine whether the size of the index of the string of the element is smaller than or equal to the size of the remaining space of the current to-be-stored block. If the size of the index of the string of the element is smaller than or equal to the size of the remaining space of the current to-be-stored block, the storage circuitry 1206 is further configured to store the index of the string of the element in the current to-be-stored block, and store the string of the element in an external block list corresponding to the index.

The inserted element obtaining circuitry 1214 is configured to obtain a to-be-inserted element, a first target block, and an insertion position in the first target block.

The second determining circuitry 1216 is configured to determine whether a size of the to-be-inserted element is larger than a size of a remaining space of the first target block.

The storage circuitry 1206 is further configured to store the to-be-inserted element in the insertion position in the first target block if the size of the to-be-inserted element is larger than the size of the remaining space of the first target block, move a succeeding element at the insertion position in the first target block toward a succeeding position of the insertion position, configure a new block of a fixed size, and store an element at the succeeding position exceeding the first target block in the new block.

The deletion instruction obtaining circuitry 1218 is configured to obtain an element deletion instruction that includes a specified element and a second target block where the specified element is located.

The deletion circuitry 1220 is used to delete the specified element from the second target block according to the element deletion instruction.

The third determining circuitry 1222 is configured to determine whether a size of a string of an element in a succeeding block of the second target block is smaller than or equal to a size of a remaining space of the second target block.

The combination circuitry 1224 is configured to combine the string of the element in the succeeding block of the second target block into the second target block if the size of the string of the element in the succeeding block of the second target block is smaller than or equal to the size of the remaining space of the second target block.

The classification circuitry 1226 is configured to obtain a hash value of a key in each block of the tree-shaped structure if the data structure type is a hash value type, a string set type, or a sorted string set type zset, divide the key into multiple parts according to the hash value of the key, and store each part of the key by using an independent balanced tree.

The query circuitry 1228 is configured to obtain a query instruction of the key.

The searching circuitry 1230 is configured to search for the key from the independent balanced tree according to the query instruction.

In another embodiment, a data storage device may include any possible combination of a data obtaining circuitry 1202, a configuration circuitry 1204, a storage circuitry 1206, an addition circuitry 1208, a size obtaining circuitry 1210, a first determining circuitry 1212, an inserted element obtaining circuitry 1214, a second determining circuitry 1216, a deletion instruction obtaining circuitry 1218, a deletion circuitry 1220, a third determining circuitry 1222, a combination circuitry 1224, a classification circuitry 1226, a query circuitry 1228, and a searching circuitry 1230, and is not limited to the listed embodiment.

A person of ordinary skill in the art may understand that all or some of the steps of the foregoing embodiments may be implemented by a program instructing relevant hardware. The program may be stored in a non-volatile computer readable storage medium. When the program is executed, the program may include the flows of the embodiments of each foregoing method. The storage medium may be a magnetic disk, an optical disc, a read-only memory (ROM), or the like.

The system 1100 may be implemented in many different ways. For example each component of the system 1100 may include a circuit or circuitry. Each circuit or circuitry may be hardware or a combination of hardware and software. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the non-transitory storage medium described in reference to FIG. 1, for example, that comprises instructions executable with the processor or other processor to implement one or more of the features of the circuitry. When any one of the circuitry includes the portion of the non-transitory storage medium that comprises instructions executable with the processor, the circuitry may or may not include the processor. In some examples, each circuitry may just be the portion of the non-transitory storage medium or other physical memory that comprises instructions executable with the processor or other processor to implement the features of the corresponding circuitry without the circuitry including any other hardware. Because each circuitry includes at least some hardware even when the included hardware comprises software, each circuitry may be interchangeably referred to as a hardware circuitry.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

What is claimed is:

1. A data storage method for a key-value storage system, comprising:
   obtaining data, a size of the data, and a data structure type of the data;
   allocating a memory block for the data based on the size of the data and a predetermined block size;
   storing the data in the allocated memory block, the allocated memory block comprising a block attribute that includes the data and a head comprising management information corresponding to the block attribute, and the management information comprising a first block identifier for an antecedent memory block and a second block identifier for a succeeding memory block; and
   linking, based on the data structure type, the allocated memory block to a plurality of memory blocks arranged in a block list structure in response to the data structure type being at least one of a list type or a string type.

2. The method of claim 1, further comprising:
   linking the allocated memory block to a tree-shaped structure in response to the data structure type being at least one of a hash value type, a string set type, or a sorted string set type.

3. The method of claim 1, wherein the data structure type comprises at least one of a list type, a hash type, a hash value type, a string set type, or a sorted string set type, the method further comprising:
   obtaining a size of a string of an element of the data;
   comparing the size of the string of the element with a size of a remaining space of the memory block;
   in response to the size of the string of the element being smaller than or equal to the size of the remaining space of the memory block, storing the string of the element in the memory block;
   in response to the size of the string of the element being greater than the size of the remaining space of the memory block:
      obtaining a size of an index of the string of the element, and
      determining whether the size of the index of the string of the element is smaller than or equal to the size of the remaining space of the memory block; and
   in response to the size of the index of the string of the element being smaller than or equal to the size of the remaining space of the memory block:
      storing the index of the string of the element in the memory block, and
      storing the string of the element in an external block list corresponding to the index.

4. The method of claim 3, wherein storing the string of the element in an external block list corresponding to the index further comprises:
   determining whether the size of the string of the element is smaller than or equal to a size of an external memory block;
   in response to the size of the string of the element being less than or equal to the size of the external memory block, storing the string of the element in the external memory block as the external block list;
   in response to the size of the string of the element being greater than the size of the external memory block, splitting the string of the element into multiple sections according to the size of the external memory block;
   configuring a corresponding quantity of external memory blocks;
   associating the corresponding quantity of external memory blocks to form the external block list; and
   storing the string of the element in the external block list.

5. The method of claim 1, further comprising:
   obtaining an element included in the data, a first target block from the plurality of memory blocks, and an insertion position in the first target block;
   determining a size of the element is larger than a size of a remaining space of the first target block; and
   in response to the size of the element being larger than the size of the remaining space of the first target block:
      storing a portion of the element starting at the insertion position in the first target block,
      configuring a new memory block of a fixed size, and
      storing a remainder of the element in the new memory block.

6. The method of claim 1, further comprising:
   obtaining an element deletion instruction that comprises a specified element and a target block where the specified element is located;
   deleting the specified element from the target block according to the element deletion instruction;
   determining a size of a string of an element in a succeeding memory block of the target block is smaller than or equal to a size of a remaining space of the target block; and
   in response to the size of the string of the element in the succeeding memory block of the target block being less than or equal to the size of the remaining space of the target block, combining the string of the element in the succeeding memory block of the target block into the target block.

7. The method of claim 1, further comprising:
obtaining a hash value of a key in each memory block in response to the data structure type being at least one of a hash value type, a string set type, or a sorted string set type;
dividing the key into multiple parts according to a hash value of the key;
storing the multiple parts of the key in an independent balanced tree;
obtaining a query instruction corresponding to the key; and
searching for the key from the independent balanced tree according to the query instruction.

8. The method of claim 1, wherein linking, based on the data structure type, the allocated memory block to the plurality of memory blocks arranged in the block list structure further comprises:
obtaining a block identifier of the allocated memory block;
recording the block identifier of the memory block in a head of a previous memory block; and
recording an identifier of the previous memory block in a head of the allocated memory block.

9. The method of claim 1, further comprising:
obtaining a data access request; and
locating a corresponding memory block in the plurality of memory blocks according to the data access request and traversing the corresponding memory block to obtain data based on the data access request.

10. A data storage system, comprising a processor, the processor configured to:
obtain data, a size of the data, and a data structure type of the data;
allocate a memory block for the data based on the size of the data and a predetermined block size;
store the data in the allocated memory block, the allocated memory block comprising a block attribute that includes the data and a head comprising management information corresponding to the block attribute, and the management information comprising a first block identifier for an antecedent memory block and a second block identifier for a succeeding memory block; and
link, based on the data structure type, the allocated memory block to a plurality of memory blocks arranged in a block list structure, wherein to link the allocated memory block to the block list structure, the processor is further configured to:
associate the allocated memory block with the block list structure in response to the data structure type being at least one of a list type or a string type.

11. The data storage system of claim 10, wherein the processor is further configured to:
associate the allocated memory block with a tree structure in response to the data structure type being at least one of a hash value type, a string set type, or a sorted string set type.

12. The data storage system of claim 10, wherein the data structure type comprises at least one of a list type, a hash type, a hash value type, a string set type, or a sorted string set, the processor further configured to:
obtain a size of a string of an element of the data;
compare the size of the string of the element with a size of a remaining space of the memory block;

in response to the size of the string of the element being smaller than or equal to the size of the remaining space of the memory block, store the string of the element in the memory block;
in response to the size of the string of the element being greater than the size of the remaining space of the memory block:
obtain a size of an index of the string of the element, and
determine the size of an index of the string of the element is smaller than or equal to the size of the remaining space of the memory block; and
in response to the size of the index of the string of the element being smaller than or equal to the size of the remaining space of the memory block:
store the index of the string of the element in the memory block, and
store the string of the element in an external memory block list corresponding to the index.

13. The data storage system of claim 12, wherein to store the string of the element in an external block list corresponding to the index, the processor is further configured to:
determine whether the size of the string of the element is smaller than or equal to a size of an external memory block;
in response to the size of the string of the element being less than or equal to the size of the external memory block, storing the string of the element in the external memory block;
in response to the size of the string of the element being greater than the size of the external memory block, splitting the string of the element into multiple sections according to the size of the external memory block;
configure a corresponding quantity of external memory blocks;
associate the corresponding quantity of external memory blocks to form the external block list; and
store the string of the element in the external block list.

14. The data storage system of claim 10, wherein the processor is further configured to:
obtain an element included in the data, a first target block from the plurality of memory blocks, and an insertion position in the first target block;
determine a size of the element is larger than a size of a remaining space of the first target block; and
in response to the size of the element being larger than the size of the remaining space of the first target block:
store a portion of the element starting at the insertion position in the first target block,
configure a new memory block of a fixed size, and
store a remainder of the element in the new memory block.

15. The data storage system of claim 10, wherein the processor is further configured to:
obtain an element deletion instruction that comprises a specified element and a target block where the specified element is located;
delete the specified element from the target block according to the element deletion instruction;
determine a size of a string of an element in a succeeding memory block of the target block is smaller than or equal to a size of a remaining space of the target block; and
in response to the size of the string of the element in the succeeding memory block of the target block being less than or equal to the size of the remaining space of the target block, combine the string of the element in the succeeding memory block of the target block into the target block.

16. The data storage system of claim 10, wherein the processor is further configured to:
obtain a hash value of a key in each block in response to the data structure type being at least one of a hash value type, a string set type, or a sorted string set type;
divide the key into multiple parts according to a hash value of the key;
store the multiple parts of the key in an independent balanced tree;
obtain a query instruction corresponding to the key; and
search for the key from the independent balanced tree according to the query instruction.

17. The data storage system of claim 10, wherein to link, based on the data structure type, the allocated memory block to the plurality of memory blocks arranged in the block list structure, the processor is further configured to:
obtain a block identifier of the allocated memory block;
record the block identifier of the memory block in a head of a previous memory block; and
record an identifier of the previous memory block in a head of the allocated memory block.

18. The data storage system of claim 10, wherein the processor is further configured to:
obtain a data access request; and
locate a corresponding memory block in the plurality of memory blocks according to the data access request and traversing the corresponding memory block to obtain data based on the data access request.

* * * * *